United States Patent Office 3,447,938
Patented June 3, 1969

3,447,938
LIGHTWEIGHT HIGH-STRENGTH CEMENT COMPOSITIONS
Anatole N. Vassilevsky, New York, N.Y., assignor to V.R.B. Associates, Inc., Lincolndale, N.Y., a corporation of the United States of America
No Drawing. Continuation-in-part of application Ser. No. 306,702, Sept. 5, 1963. This application Aug. 8, 1966, Ser. No. 570,743
Int. Cl. C04b 15/02
U.S. Cl. 106—105      2 Claims

ABSTRACT OF THE DISCLOSURE

Hydraulic cement for admixture with water and inorganic or organic fillers, the cement consisting essentially of an anhydrous composition of magnesium oxide, magnesium sulfate and an alkaline-earth metal chloride selected from the group of calcium chloride, barium chloride and strontium chloride, said magnesium oxide being present in an amount by weight exceeding that of the magnesium sulfate and said alkaline-earth metal chloride being present in a molar quantity of less than that of the magnesium sulfate.

---

This application is a continuation-in-part of my copending application Ser. No. 306,702 filed Sept. 5, 1963 (now abandoned).

The present invention relates to improved magnesia cement compositions suitable for use as hydraulic binders in compositions containing various types of fillers. In the aforementioned co-pending application, I have pointed out that magnesia cements have been known in the art for nearly one hundred years and that a class of cements, identified hereinafter as Sorel cements, make use of calcined magnesia and magnesium chloride to form a more or less complex salt which can be characterized generally as a hydrate form of magnesium oxychloride. The discovery that such a hydraulic binder could be used with organic wastes to form hardenable cementitious materials represented perhaps the most significant advance in the field since the development of the portland cements. Portland cements, however, require relatively pure aggregates, predominantly clean silica sand, and are totally unsuitable for use with organic matter and natural soils, earths, and clays containing such organic matter. It is understood that portland cements can be used effectively in construction only when a washed, sieved or otherwise purified and clean sand is employed. Thus the Sorel cements were capable of overcoming a substantial disadvantage of the conventional portland cements inasmuch as they are capable of operating with organic constituents in the filler material. In fact, many patents have issued since the discovery of the Sorel composition, substantially all of which propose Sorel-type cements which can be considered exclusively magnesium oxychlorides. A typical composition of this type requires the combination of magnesia and magnesium chloride in stoichiometric quantities equivalent to the formula $MgCl_2 \cdot 5MgO \cdot 17H_2O$. The basic Sorel system required that the calcined magnesia (MgO) be admixed with an aqueous solution of magnesium chloride ($MgCl_2$) to form the binder with obvious disadvantages. Subsequent workers were able to eliminate the formulation problems by generating the magnesium chloride component in situ by reacting magnesium sulfate with a chloride whose sulfate salt was substantially insoluble so that the reaction, as far as the sulfate and chloride ions are concerned, was a simple exchange with total precipitation of sulfate or the tying of this ion into an insoluble compound. Thus it has been proposed to form the stoichiometric quantity of the magnesium chloride required for the Sorel system by admixing barium chloride with the stoichiometric equivalent of magnesium sulfate. When this is done, all of the sulfate is apparently tied up as the insoluble barium sulfate salt while all of the chloride appears as magnesium chloride. All of these Sorel-type cements have the significant disadvantage that, when they are prepared as powdered binders for later admixture with a filler, they are hygroscopic and have relatively poor shelf life. Furthermore, when compositions are formed of such binders and organic fillers, ordinary soil or clay or the like, the cost of such compositions is relatively high, the compressive strength is not necessarily always satisfactory and the long-term durability of the composition appears to be limited. In any event, it has been found impractical to use Sorel-type cements in large-scale construction even in countries where high-quality sand and like fillers are not available and where skilled workers are unavailable.

It is the principal object of the present invention, therefore, to provide an improved hydraulic binder for hardenable cementitious compositions in which the advantages of Sorel-type cements are retained and the disadvantages thereof are obviated.

A further object of this invention is to provide a cementitious material suitable for use as a binder for fillers containing organic matter and of relatively low cost so as to render the cementitious material highly suitable for use in regions where high-quality fillers are unavailable.

These objects and others which will become apparent hereinafter are attained in accordance with the present invention which is based upon my surprising discovery that an excellent hydraulic-cement binder for both organic and inorganic fillers is constituted of magnesium oxide, magnesium sulfate and an alkaline-earth metal chloride (e.g. calcium chloride, barium chloride and strontium chloride), when the magnesium oxide is present in an amount by weight exceeding that of the magnesium sulfate and the alkaline-earth metal chloride is present in at least 10% by weight of the cement but in a molar quantity less than that of the magnesium sulfate. More specifically, I have found that excellent binders can be prepared without the danger that hygroscopicity will cause deterioration of the hydraulic cement before it is combined with water and a filler, and which yields a hardenable composition with inorganic and organic fillers of substantially all types with characteristics approaching those of the highest-quality portland cement compositions. The invention is based upon the fact that the binder, when combined with water and permitted to set, appears to be a highly complex magnesium oxychloride-oxysulfate and this complex appears to have a binding strength, resistance to abrasion, durability and stability far exceeding the corresponding characteristics of both magnesium sulfate cement and Sorel-type magnesium chloride cement. The alkaline-earth-metal chloride forms, upon admixture of the binder with water, a more or less insoluble sulfate by double displacement with the magnesium sulfate, the resulting calcium, barium or strontium sulfate forming a filler bound in the complex. Unlike prior Sorel cements, however, only a fraction of the magnesium sulfate component is converted into magnesium chloride while the balance remains in the sulfate form. The hardened composition is thus an oxychloride/oxysulfate of unique characteristics.

While the hardened cement binder of the present invention will be referred to hereinafter as essentially a magnesium oxychloride/sulfate, it will be understood that it is likely to contain the following species:

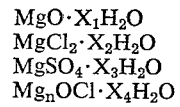
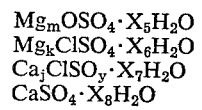

where $X_1$ through $X_8$ represent water of hydration and the alkaline-earth metal is, for purposes of illustration, indicated as calcium. The subscripts $j$, $k$, $y$, $m$ and $n$ represent integral or fractional values depending upon the actual composition of the particular portion of the complex. Each of these species appears to be present in chemical combination with the balance in the hardened binder, and further chemical bonds connect the binder with the filler. Thus the hardened binder can be empirically described as having the empirical formula:

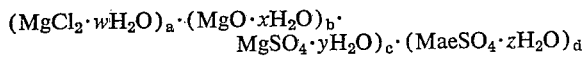

$$(MgCl_2 \cdot wH_2O)_a \cdot (MgO \cdot xH_2O)_b \cdot (MgSO_4 \cdot yH_2O)_c \cdot (MaeSO_4 \cdot zH_2O)_d$$

where Mae is an alkaline-earth metal selected from the group consisting of calcium, barium and strontium; $w$, $x$, $y$ and $z$ are units representing molecules of water of hydration; and $a$ ranges between 1 and 3,
$b$ ranges between 12.5 and 15.5,
$c$ ranges between 1.5 and 2.2, and
$d$ ranges between 1 and 3.

The foregoing molecular relationships are based upon my discovery that best results are obtained when the hydraulic cement, which is designed to be mixed with water and inorganic or organic fillers, consists in its powdered form of anhydrous magnesium sulfate present in an amount ranging between 2.8 and 3.3 parts by weight, anhydrous magnesium oxide present in an amount ranging between 4.5 and 5.5 parts by weight and the alkaline-earth metal chloride present in anhydrous form and in an amount ranging between 1 and 3 parts by weight. It is essential in accordance with the principles of this invention that the foregoing proportions be maintained for most satisfactory results with inorganic and organic fillers which do not require prior preparation. Such fillers include cellulosic materials, ordinary earth, and the like. Another critical aspect of this invention is that the alkaline-earth metal chloride, the magnesium oxide and the magnesium sulfate are calcined individually prior to their combination to form the hydraulic cement composition. The resulting cement has an excellent shelf life, a surprising fact in view of the tendency of calcium chloride, for example, to interact with magnesium sulfate in double-displacement reactions. Furthermore, I have discovered that the cement, when prepared in this fashion, combines with water and probably the filler in a highly exothermic reaction which yields a setting rate far superior to any obtainable with Sorel-type cement and increasing both the strength of the bond to organic and inorganic fillers and the rate of formation of a hard abrasion resistant and nonhygroscopic body.

The fillers suitable for use with the hydraulic-cement binder of the present invention can include inorganic materials such as ordinary sand, gravel, metallurgical slag, aluminum silicates, metal powder and asbestos, as well as organic fillers, usually of the cellulosic type. Suitable organic fillers include cellulose, wood fibers, sawdust, wood chips, corn cobs, bagasse, leaves, waste fiber and residual materials of oil-pressing processes. More generally, the filler may be constituted at least in major part by ordinary earth which contains inorganic components as well as organic fibers and other organic constituents. For proper setting of the cement it is advisable that the water supplied throughout and incorporated in the binder as water of hydration or crystallization should not exceed 25% of the total mass of the hardened composition.

Excellent results are obtained when the composition consist essentially of 1 to 3 parts by weight calcium chloride, 3 parts by weight magnesium sulfate and 5 parts by weight magnesium oxide; the filler is earth or cellulosic material and the alkaline-earth metal is calcium, the composition being formed by preparing a hydraulic cement by admixing 2.8 to 3.3 parts by weight anhydrous magnesium sulfate, 4.5 to 5.5 parts by weight of anhydrous magnesium oxide, and 1 to 3 parts by weight of anhydrous calcium chloride, combining the cement with 2 to 6 parts by weight of the filler and with water, and permitting the resulting composition to set.

Other suitable compositions consist of essentially 5 parts by weight of aluminum silicate or silica, 40 parts by weight of magnesium oxide, 20 parts by weight of barium chloride, and 27 parts by weight of magnesium sulfate; substantially two parts by weight of aluminum silicate or silica, 5 parts by weight of magnesium oxide ground together with said aluminum silicate or silica, 3 parts by weight of barium chloride, 3 parts by weight magnesium sulfate and 2 parts by weight of strontium chloride ground together with said barium chloride; and substantially 10 parts by weight silica, 48 parts by weight magnesium sulfate, 20 parts by weight calcium chloride, 8 parts by weight strontium chloride and 80 parts by weight magnesium sulfate.

The physical characteristics of my hardened cement, regardless of the filler chosen, are easily reproducible and compare favorably with the other magnesia cements mentioned earlier as well as the highest-quality portland cements currently available. For example, the hardened compositions of my invention generally have crushing strengths of the order of magnitude of 175 kg./cm.$^2$, a modulus of rupture essentially 65 kg./cm.$^2$ and a modulus of elasticity in the range of essentially 4625 kg./cm.$^2$ for a typical composition; the composition was also able to resist a flexure stress of about 54 kg./cm.$^2$.

A particularly suitable lightweight hardened composition consists of the cementitious composition admixed with sawdust and water to form a slurry which is then allowed to set in air, and also comprises an aggregate of sand or stone powder in a ratio of substantially 5 to 10 parts by weight of said sand or stone powder to about 20 parts by weight of said cementitious composition.

The cement according to my invention will withstand temperatures of up to 800° C. even with sawdust used as a filler; it does not rot, and it is not attacked by termites or by rats and other rodents.

Moreover, I have ascertained that the improved composition of the present invention has excellent resistance to fire and moisture, atmospheric conditions and heat without requiring additional substances to modify the inherent characteristics of the composition. Furthermore, the binder is capable of use with substantial quantities of filler (e.g. ranging to, say, 60%–70% of the composition). This is especially important when the final hardened material is to have a low specific gravity. I have found further that it is desirable to select the filler so that it contains an aluminum silicate or silica component whose proportion, by comparison with earlier compositions, is relatively low and may range between 5 and 35% by weight of the entire composition prior to the admixture of water therewith. A typical system thus includes the hydraulic cement prepared as described above, an organic filler and a silica or aluminum silicate filler in the proportion indicated. By incorporation of suitable bactericidal and fungicidal agents, the materials prepared for the cements may be made highly resistant to attack by such microorganisms.

The invention is illustrated hereinafter by a number of specific examples representing the best mode currently known to me for carrying out the invention in practice.

CEMENT NO. 1

5 parts by weight of aluminum silicate or silica, 40 parts by weight of previously calcined magnesium oxide, or an equivalent amount of previously calcined magnesite, 20 parts by weight of barium chloride and 20 parts by weight of calcined magnesium sulfate are mixed, ground to a fine powder, and stored in polyethylene bags or other suitable airtight containers. The calcination is carried out at 750° to 780° C.

CEMENT NO. 2

2 parts by weight of aluminum silicate or silica, previously calcined at 250–300° C., are mixed with 5 parts by weight of calcined magnesia or magnesite and the mixture is ground (Powder A). Separately, 2 parts by weight of previously calcined barium chloride and 1 part by weight of strontium chloride are mixed and ground together (Powder B). Thereupon the Powders A and B are mixed in a weight ratio of 2:1, and 3 parts by weight of magnesium sulfate are added to the mixture which is then stored as in the case of Cement No. 1.

CEMENT NO. 3

The ingredients enumerated below are separately subjected to a preliminary calcination at 350° C and then, after cooling, are mixed in the following proportions:

|  | Parts by weight |
|---|---|
| Silica | 5 |
| Calcined magnesite | 48 |
| Calcined magnesium sulfate | 29 |
| Calcined calcium chloride | 10 |
| Calcined strontium chloride | 8 |

The mixture is ground to a fine powder and, if necessary, subjected to additional drying. Thereupon it is stored as in the case of Cement No. 1.

The following examples are given to illustrate the manner in which the aforementioned cements are used in the preparation of hardened compositions:

Example I 80 parts by weight of Cement No. 1, 2 or 3 is mixed with 50 parts by weight of water to a consistency of heavy cream. Then there is added 30 parts by weight of sawdust, and the slurry is stirred to uniform consistency. It is then poured into molds and allowed to set in the open air without heating.

Example II 20 parts by weight of Cement No. 1, 2 or 3 is mixed with 12 parts by weight of water to a consistency of a heavy cream. Then there is added 7 parts by weight of sawdust and 5 parts by weight of sand. The resulting slurry is placed in a mold with application of pressure as the mixture is fairly dry and does not flow freely.

Example III 20 parts by weight of Cement No. 1, 2 or 3 is mixed with 12 parts by weight of water, and to this mixture 10 parts by weight of stone powder is added. The mixture is stirred until a thick slurry is obtained, and then treated as in Example I.

In addition to casting or molding, the cement in slurry may be used to impregnate cardboard, plywood or wood panels, thereby producing noncombustible, waterproof, stony panels of superior strength.

The materials prepared in accordance with the present invention are well suited for a wide variety of applications. In the field of building construction, for example, hollow bricks made from these materials provide good thermal and acoustic insulation. Sheets and panels made by means of my cements can be used for flooring, in the construction of driveways, walks, stairs, and terraces. Building materials prepared with these cements lend themselves ideally to prefabricated-house construction. Further, since most of the components used in the preparation of these materials are relatively impervious to gamma radiation, they offer an added protection against such rays when employed in the construction of radiation shelters.

When mixed with cellulosic and plastic materials, or both, these cements produce, in many instances, a new product of greater strength than the cellulosic or plastic substances themselves, and much less expensive. Since my novel cements bind any mineral, including stones or earth, along with any wood or cellulosic scraps into a homogeneous mass, crushers set up near the site of a demolished building can prepare new material right on the spot. Finally, and by way of further examples illustrating the possible applications of my improved cements, textile, burlap or nylon materials added to the cement mixture produce panels similar to sheetrock but of higher strength than the latter, possessing the added advantage that they are cleaner to work than sheetrock.

The equipment required for the manufacture of these cements is very simple, consisting merely of an oven for the calcination, a grinding mill, mixers, and drying and packaging apparatus.

It will be noted from the foregoing description that I have disclosed a composition of material which includes, in addition to a comminuted filler material which may be organic or inorganic, a cement consisting substantially exclusively of a minor proportion of a siliceous compound, for instance silica and aluminum silicate or mixture of both, and a major proportion of a bonding agent. Manifestly small amounts of additional ingredients, e.g. coloring agents or the aforementioned antimicrobial admixtures, may be included with the principal ingredients referred to. Furthermore, the cements according to my invention are found to have antimicrobial properties.

Example IV

A hydraulic binder is prepared by individually calcining calcium chloride, magnesium oxide and magnesium sulfate at a temperature of 750–780° C. Each of the calcined components is ground and combined with the others in the following proportions: 3 parts by weight of magnesia MgO, 3 parts by weight of anhydrous magnesium sulfate $MgSO_4$ and 1 to 2 parts by weight of anhydrous calcium chloride $CaCl_2$. The powder is placed in a polyethylene bag and stored in a humid environment for several weeks. No deterioration of the cement is observed.

A comparison was made between a portland cement composition prepared in accordance with ASTM procedure with 1 part portland cement and 4 parts of clean washed and sieved sand. This composition was compared with a "soil cement" prepared by mixing 1 part of the powder stored as above with 4 parts by way of ordinary garden earth containing substantial proportions of organic material in addition to the usual mineral matter. The results and characteristics of the tests are set forth below:

A. Flexural strength.—Tests were conducted in accordance with ASTM C348. Test specimens for each type of mortar were aged for nine days at room temperature.

| | Flexural strength (p.s.i.) | |
|---|---|---|
| Test specimen | Soil mortar (present invention) | Portland cement mortar |
| 1A | 309 | 382 |
| 1B | 281 | 418 |
| 2A | 281 | 400 |
| 2B | 315 | 437 |
| 3A | 304 | 406 |
| 3B | 270 | 448 |
| Average | 293 | 415 |

B. Resistance-to-abrasion wear.—The abrasion-wear tests were conducted after test specimens had cured for nine days at room temperature.

The Tinius Olsen Wearometer, as specified in Military Specification, Mil–D–3134F, was used.

The wear after 1000 cycles for each type mortar is shown below. Two test speciments for each mortar were used.

SOIL MORTAR

The loss in thickness after 1000 cycles of wear:

|  | Inch |
|---|---|
| Specimen #1 | 0.101 |
| Specimen #2 | 0.096 |
| Average | 0.099 |

PORTLAND CEMENT MORTAR

The loss in thickness after 1000 cycles of wear:

|  | Inch |
|---|---|
| Specimen #1 | 0.094 |
| Specimen #2 | 0.089 |
| Average | 0.091 |

The foregoing results demonstrate that an expensive portland cement composition using high-quality sand can effectively be replaced by an inexpensive composition such as the soil cement of the present invention using ordinary earth available at all necessary locations. Best results are obtained when 20–40 parts by weight of earth or clay are admixed with 10 parts by weight of the cement composition of the present invention. Moreover, it was found that the magnesium oxide (anhydrous) content should be confined between the critical limits of 4.5–5.5 parts by weight, the anhydrous magnesium sulfate should be confined to an amount between 2.8 and 3.3 parts by weight while the calcium chloride (anhydrous) should be present in an amount of 1–3 parts by weight. Approximately 300–400 cm.$^3$ of water is required when 1 lb. of the cement composition is admixed with 3 lbs. of earth. The cement may be admixed with water first and then combined with the earth, an exothermic reaction occurring immediately upon addition of the water to the cement.

Tests performed with samples having soil as a component have shown a compression resistance between about 3000 and 3500 lbs./in.$^2$, or better than 200 kg./cm.$^2$.

I claim:

1. A cementitious composition including a comminuted filler for hardening into a rigid lightweight body, and a cement constituted essentially of a powdered mixture of comminuted calcined magnesium oxide, comminuted calcined magnesium sulfate, and comminuted calcined barium chloride, said mixture being ground together with about 5 parts by weight of aluminum silicate or silica, said mixture consisting essentially of substantially 40 parts by weight of magnesium oxide, 20 parts by weight of barium chloride, and 27 parts by weight of magnesium sulfate.

2. A cementitious composition including a comminuted filler for hardening into a rigid lightweight body, and a cement constituted essentially of a powdered mixture of comminuted calcined magnesium oxide, comminuted calcined magnesium sulfate, and comminuted calcined calcium chloride and barium chloride, said mixture being ground together with substantially 10 parts by weight of silica, said mixture consisting substantially of 80 parts by weight of magnesium oxide, 48 parts by weight of magnesium sulfate, 20 parts by weight of calcium chloride and 8 parts by weight of strontium chloride.

References Cited

UNITED STATES PATENTS

| | | | |
|---|---|---|---|
| 396,693 | 1/1889 | Hastings | 106—105 |
| 757,252 | 4/1904 | Bidtel | 106—105 |
| 872,375 | 12/1907 | Rueff | 106—105 |
| 909,171 | 1/1909 | Ellis | 106—105 |
| 1,102,358 | 7/1914 | Siegmann | 106—105 |
| 1,107,357 | 8/1914 | Reuter | 106—106 |
| 1,333,510 | 3/1920 | Shaw et al. | 106—105 |
| 1,916,971 | 7/1933 | Denning | 106—105 |
| 2,511,904 | 6/1950 | Clasen et al. | 106—105 |
| 2,649,160 | 8/1953 | Williams et al. | 106—106 |

TOBIAS E. LEVOW, *Primary Examiner.*

S. E. MOTT, *Assistant Examiner.*

U.S. Cl. X.R.

106—106